United States Patent [19]

Korklan et al.

[11] 4,204,907

[45] May 27, 1980

[54] CONDITIONED COLLOIDAL SILICA POST IMPREGNANT TO PREVENT BINDER MIGRATION

[75] Inventors: Harris J. Korklan, Granger; John K. Greany, South Bend, both of Ind.

[73] Assignee: The Carborundum Company, Niagara Falls, N.Y.

[21] Appl. No.: 891,368

[22] Filed: Mar. 29, 1978

[51] Int. Cl.$^2$ ............................................. D21F 13/00
[52] U.S. Cl. ................................ 162/135; 162/181 C; 264/87; 264/128
[58] Field of Search ......................... 264/128, 86, 87; 162/135, 181 C

[56] References Cited

U.S. PATENT DOCUMENTS

| | | | |
|---|---|---|---|
| 3,649,406 | 3/1972 | McNish | 156/245 |
| 3,736,159 | 5/1973 | Gibson et al. | 264/87 |
| 3,835,054 | 9/1974 | Olewinski et al. | 252/62 |

Primary Examiner—Robert F. White
Assistant Examiner—James R. Hall
Attorney, Agent, or Firm—David E. Dougherty; Raymond W. Green; Michael L. Dunn

[57] ABSTRACT

The invention comprises the process for making an inorganic refractory insulation article by forming a fiber mat from a fiber slurry, impregnating the mat with a conditioned colloidal silica composition comprising colloidal silica, acid, aluminum chlorhydrate and water and drying the mat to form the article. The invention further comprises an inorganic refractory insulation article comprising randomly oriented refractory fibers retained by dried colloidal silica uniformly distributed throughout the article and from about 0.001 to about 1.5 weight percent of aluminum chlorhydrate which article is manufactured in accordance with the process.

10 Claims, 2 Drawing Figures

CONDITIONED COLLOIDAL SILICA POST IMPREGNANT TO PREVENT BINDER MIGRATION

BACKGROUND OF THE INVENTION (A) Field of the Invention

The present invention relates to a refractory insulation board wherein refractory fibers are held in the shape of a sheet or board by means of a binder composition.

(B) History of the Prior Art

Binder compositions in the prior art for binding refractory fibers were frequently not entirely satisfactory. Many such binders contained organic materials such as the binders disclosed in U.S. Pat. Nos. 3,835,054; 3,961,968 and 3,944,702. Such organic compounds are highly undesirable since they decompose at high temperature conditions frequently encountered by the insulation material.

Other totally inorganic binders, while able to withstand high temperature environments, were undesirable since during drying and curing of the fiber article, the binder tended to migrate thus causing excessive binder buildup in some areas of the article and causing the presence of insufficient binder in other areas of the article. A common example of such inorganic binders is a colloidal silica such as disclosed in U.S. Pat. Nos. 3,649,406 and 3,976,728.

It has been disclosed in U.S. Pat. No. 3,935,060 that a particular process for drying a mostly inorganic binder comprising colloidal silica and some hydrolyzed ethyl silicate can be used which avoids binder migration. The process comprises heating the article in a microwave oven to instantly evaporate the water before migration has a chance to occur. The process disclosed in U.S. Pat. No. 3,935,060 is not particularly desirable since complicated and costly microwave equipment is required. Furthermore, unless very powerful and potentially harmful microwaves are used, some migration is still believed to occur.

It has been suggested in U.S. Pat. No. 3,551,266 that migration of a silica sol (i.e., colloidal silica) binder could be prevented by the gelation of the silica sol. Such a system is useful in refractory cement containing refractory fibers, when the cement is to be rapidly applied to a particular substrate. Unfortunately, the system has been inapplicable to the production of refractory fiber articles in a continuous or semicontinuous process due to difficulties in controlling gelation. For example, the most efficient and desirable method for forming a refractory fiber board is to slurry fibers into a binder system and pour the slurry into a mold which permits excess liquid to drain from the fibers thus forming the refractory fiber board article. Continuous slurrying of fibers into a binder which will gel with time is not practical since it is difficult to prevent the gelation in the slurrying tanks or in impregnating or dipping tanks. Furthermore, if gel time is substantially increased, there is a corresponding undesirable increase in process time.

Furthermore, as indicated in U.S. Pat. No. 3,551,266, the use of the refractory fiber composition disclosed in the patent can be applied to produce a thickness of up to only about ½ inch since thicker layers of the material tend to crack.

In addition, it has been found by the Applicants herein that at colloidal silica concentrations high enough to gel upon application, resulting fiber article are too dense for obtaining the best insulation results.

BRIEF DESCRIPTION OF THE INVENTION

It has now been unexpectedly discovered that a gelable binder can be used for forming a refractory fiber insulation article such as an insulation board. The use of the gelable ceramic binder is made possible by the particular process which comprises forming the board from a refractory fiber slurry which may contain some colloidal silica and other inorganic additives by placing the slurry into a mold and draining liquid from the slurry. The resulting shaped, damp, i.e., undried, fiber article is then impregnated with a conditioned colloidal silica composition comprising colloidal silica, acid and a multivalent cation containing compound such as aluminum chlorohydrate. A differential pressure usually in the form of a vacuum may then be applied through the fiber article to remove excess liquid and the article is dried after the conditioned colloidal silica composition gels. The invention further comprises the insulation article comprising randomly oriented refractory fibers retained by cured colloidal silica uniformly distributed throughout the article.

DETAILED DESCRIPTION OF THE INVENTION

Figure 1:
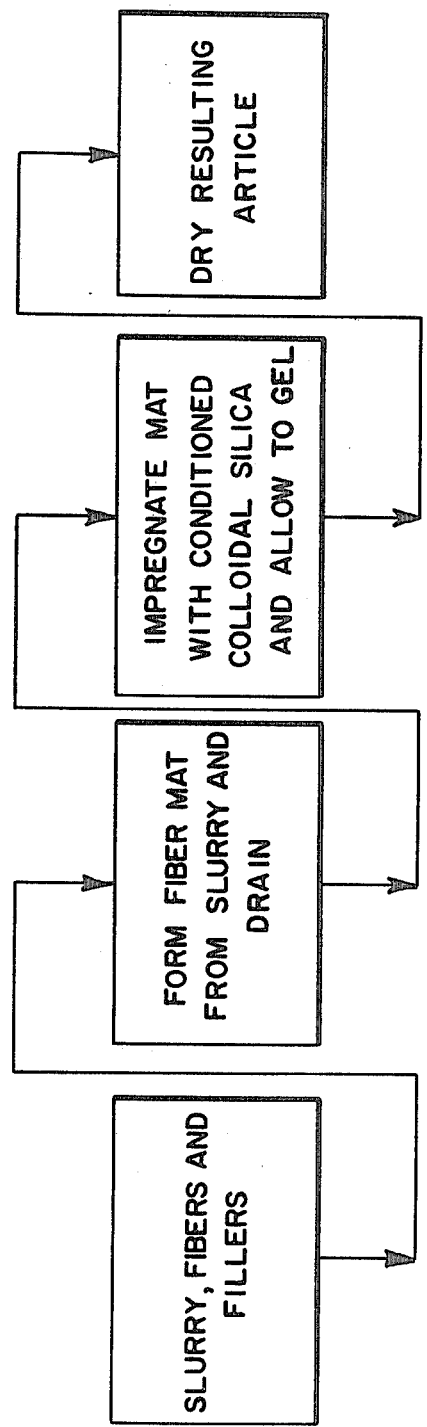
FIG. 1 is a flow diagram showing a process for the preparation of an article in accordance with a preferred embodiment of the invention.

The refractory fiber which may be bound into a refractory fiber article is essentially any fiber which is heat resistant at temperatures above about 1000° C. Examples of such refractory fibers include mullite fibers ($3Al_2O_3.2SiO_2$), aluminosilicate fibers ($Al_2O_3.SiO_2$ approximately), silica fibers ($SiO_2$), zirconia fibers ($ZrO_2$), or aluminosilicate chromia fibers (48% $Al_2O_3$, 48% Si-O, 4% $Cr_2O_3$, expressed as mole percentages), or naturally occurring fibers such as asbestos fibers. A particularly desirable ceramic fiber is available under the trade name Fiberfrax from The Carborundum Company which is described in the Condensed Chemical Dictionary, 8th Edition, Van Nostrand-Reinhold, 1971 as a ceramic fiber basically composed of 51.3% of $Al_2O_3$ and 47.2% of $SiO_2$. Such fibers are capable of withstanding continuous use temperatures up to 2300° F.

"Colloidal silica" as used herein is silica in colloidal form in an aqueous system. The colloidal silica may be prepared by passing sodium silicate through a bed of cation-exchange resin in the hydrogen form. Colloidal silicas are available from numerous manufacturers including E. I. du Pont Company under the trade designation Ludox.

"Conditioned colloidal silica" as used herein means a dispersion of from about 15 to about 40 weight percent, preferably from about 15 to about 30 weight percent, and most preferably from about 15 to about 20 weight percent colloidal silica in water to which one or more additives have been incorporated to obtain a gel time of from about 5 to about 30 minutes and preferably from about 10 to about 20 minutes at operating temperatures. One of the additives is sufficient acid to obtain a pH of below about 7.5 and preferably between about 4.7 and about 7.0 and most preferably between about 4.8 and about 5.4 when hydrochloric acid is used as the acid. Hydrochloric acid is desirable since it is effective and inexpensive. Other acids may be used such as acetic acid, sulfuric acid and phosphoric acid. Another additive which is used is a multivalent cation containing gelling agent such as water soluble salt or hydroxide of aluminum, magnesium, calcium, iron, zinc, nickel, chromium, and manganese. A particularly desirable multivalent cation containing gelling agent is aluminum chlorhydrate, i.e., $(Al_2(OH)_5Cl)_x$ also known as aluminum chlorhydroxide, which in concentrations as low as between about 0.05 to about 0.12 weight percent causes colloidal silica in concentrations as low as from about 15 to about 20 weight percent to gel in less than about 20 minutes at a pH of from about 4.8 to about 5.4 at room temperature. Such low concentrations of colloidal silica are highly desirable since application is more easily controlled and less colloidal silica is retained by an article to which it is applied thus reducing cost. If temperature is increased, gel time can be decreased. Table I in Example I shows the effects of colloidal silica concentration temperature, pH, type of acid, and aluminum chlorhydrate multivalent cation gelling agent upon colloidal silica gel time.

"Colloidal clay" as used herein means any refractory inorganic clay having a colloidal particle size. An example of a suitable colloidal clay is bentonite.

As seen in FIG. 1, in accordance with a preferred embodiment of the invention, refractory fibers and fillers such as silica flour and clay are dispersed into water. Small amounts of colloidal silica and multivalent cation containing compound may also be added. The dispersion is then formed into a mold and liquid is drained from the fibers. The formed article is then released from the mold into a carrier, placed in a second station and soaked with conditioned colloidal silica. A differential pressure is then desirably though not essentially applied through the article, usually in the form of a vacuum. The conditioned colloidal silica remaining in the article is then permitted to gel and the article is dried and cured with heat.

The refractory fiber article in accordance with the invention is manufactured by slurrying refractory fibers into a liquid which, for many reasons including low cost, non-flammability and low toxicity, is usually water. The refractory fibers in the slurry usually comprise from about 5 to about 10 percent by weight of the slurry and preferably comprise from about 1 to about 3 percent by weight of the slurry. The slurry desirably also contains from about 0.02 weight percent to about 2 percent, preferably from about 0.4 weight percent to about 0.4 weight percent and most preferably from about 0.04 to about 0.2 weight percent colloidal silica. It has also been found that from about 0.01 to about 0.1 percent of colloidal clay and from about 0.01 to about 0.1 percent of aluminum chlorhydrate are beneficially added to the slurry.

The clay is desirably, though not necessarily, premixed in water to form a 2 to 5 weight percent dispersion prior to addition to the slurry.

In forming the slurry, the fiber is desirably added to agitated water followed by the independent addition of colloidal silica, clay and multivalent cation containing compounds and silica flour filler in the listed order.

After all of the components are added to the slurry, the slurry is desirably thoroughly and rapidly mixed for from about 5 to about 30 minutes. The slurry is continuously agitated while it is pumped or drawn by a vacuum to a mold submerged in the slurry wherein water from the slurry is permitted to pass through a screen in the mold thus forming a fiber mat against the screen. The thickness of the mat is determined by the fiber concentration in the slurry and the quantity of liquid passing through the screen which in turn is determined by the length of time the mold remains submerged in the slurry. The mold is then removed from the slurry and excess liquid is removed from the mold by gravity draining, vacuum, compressed air or any other suitable means.

The damp mat is then removed from the mold by any suitable means such as picking the mat up with a suction device or rotating the mold 180° so that the mat falls from the mold by gravity. Compressed air may be applied through the mold screen to assist in loosening and removing the mat. After the mat is removed, it is carried to a frame which permits a vacuum to be drawn through the mat. The mat may be carried by any holding and transporting means such as a holding tray or a suction carrier attached to a chain or belt conveyor.

The fiber mat is then impregnated, i.e., soaked, with a conditioned colloidal silica composition which in a preferred embodiment of the invention comprises from about 98.5 to about 99 weight percent of a 15% dispersion of colloidal silica, from about 0.3 to about 1% of HCl and from about 0.05 to about 0.8 weight percent of aluminum chlorhydrate. The article is preferably impregnated with from about 10% to about 80% volume percent of the conditioned colloidal silica composition.

After the article is impregnated with the conditioned colloidal silica composition, in a preferred embodiment of the invention a differential pressure, usually in the form of a vacuum, is applied to pull excess liquid through the article. Generally, in the preferred embodiment, when the article is about 5 millimeters (mm) thick, a vacuum of from about 6 to about 10 centimeters of mercury is applied for from about 15 to about 20 seconds. When the article is about 10 mm thick, a vacuum of from about 7 to about 12 centimeters of mercury is applied for from about 20 to about 45 seconds, when the article is about 25 millimeters (mm) thick, a vacuum of from about 12 to about 25 centimeters of mercury is applied for from about 30 to about 60 seconds, and when the article is about 50 millimeters (mm) thick, a vacuum of from about 25 to about 45 centimeters of mercury is applied for from about 30 to about 60 seconds, with adjustments made as necessary.

The post soaked article, such as an insulation board, is then placed on a drying plate and dried at a temperature of from about 150 to about 600° C. for from about 1 to about 12 hours.

The resulting finished inorganic refractory insulation article, which is usually an insulation board, comprises randomly oriented refractory fibers retained by dried colloidal silica uniformly distributed throughout the article and from about 0.001 to about 1.5 weight percent of aluminum chlorhydrate. The article is characterized by uniform strength and does not smoke, discolor, or flame upon exposure to a high temperature (eg. above 350° C.) oxygen containing atmosphere. When the article is an insulation board, it desirably has a density of from about 0.4 to about 0.6 grams per cubic centimeter (gms/cc), contains from about 30 to about 50 weight percent fiber, contains from about 10 to about 45 weight percent dried colloidal silica, contains from about 0.001 to about 1.5 weight percent aluminum chlorhydrate and the balance being a filler selected from the group consisting of ground silica having an average particle size of smaller than about 200 mesh, colloidal clay and mixtures thereof.

Figure 2:
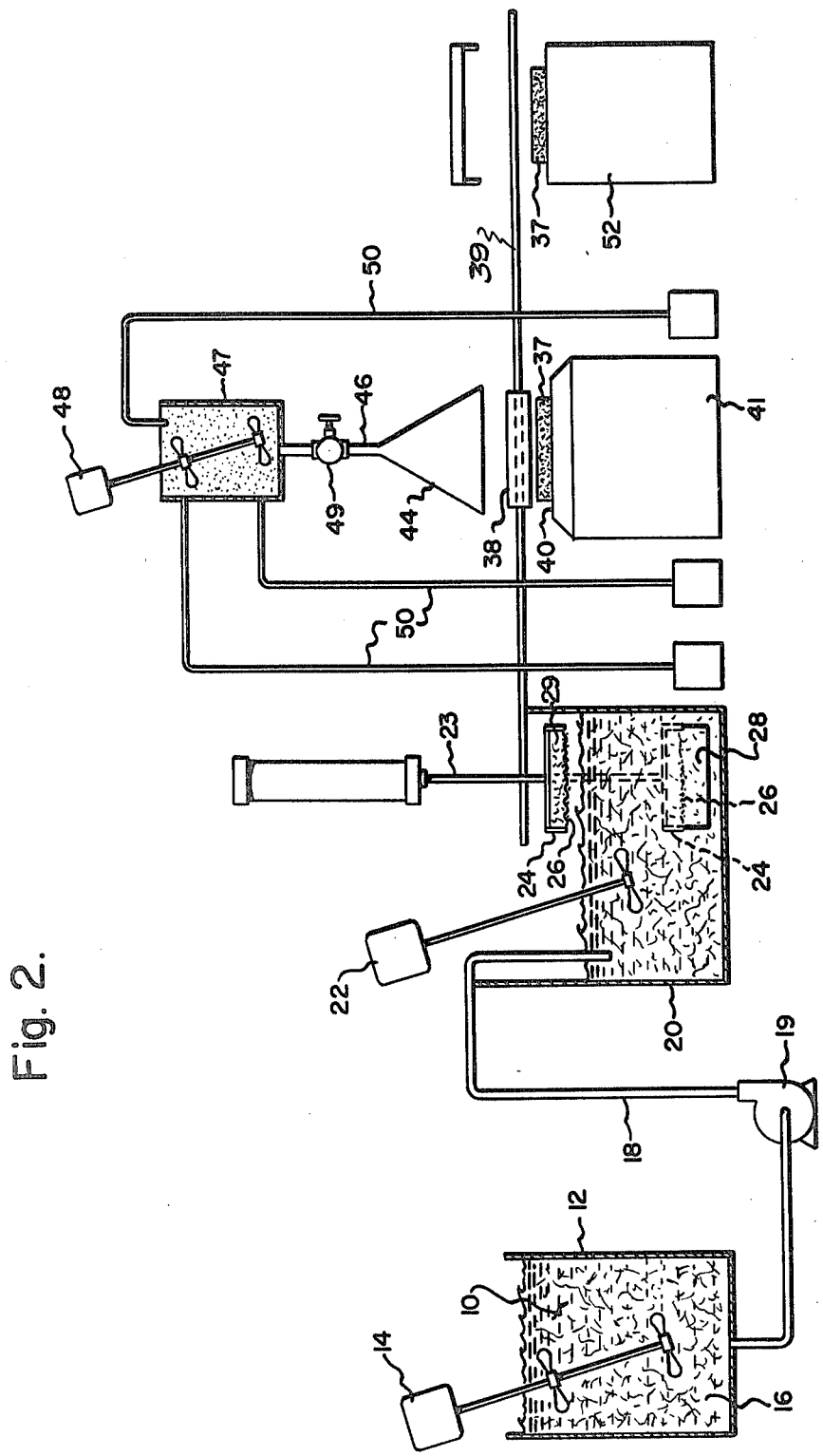
FIG. 2 is a schematic diagram of an apparatus for forming the fiber article in accordance with a preferred embodiment of the invention.

As best seen in FIG. 2, in accordance with a preferred embodiment of the invention, refractory fibers 10 are dispersed in tank 12 by means of agitator 14. Resulting slurry 16 is then transported through pipe 18 by means of pump 19 into forming tank 20. In forming tank 20, the slurry is maintained by means of mixer 22. Mold 24 provided with screen 26 is then immersed into tank 20 by an immersing means which may be a hydraulic support 23. Liquid is then permitted to pass through screen 26 thus collecting a mat of fibers 29. Liquid may be assisted in passing through the screen by a pump or vacuum device 28. Mold 24 is then removed from tank 20 by means of support 23 and liquid is removed from mat 29 by draining. The draining can be assisted by a vacuum or compressed air (not shown). A transfer box 38 on a track 39 then picks up mat 29 which is in the form of a board 37 by means of a vacuum (not shown) and places board 37 on vacuum plate 40 at post soak station 41. Fiber mat 29 is then impregnated with conditioned colloidal silica composition by means of applicator 44 which is supplied with colloidal silica composition held in mix tank 47 and blended with mixer 48 by means of pipe 46 and valve 49. Colloidal silica, hydrochloric acid and aluminum chlorhydrate are supplied to tank 47 through pipes 50. Excess conditioned colloidal silica is removed by a vacuum applied by vacuum plate 40.

Transfer box 38 then again picks up board 37 and transports it to drying rack 52 where it is dried and cured.

EXAMPLE I

In order to show the effects of weight percent colloidal silica, pH, type of acid, weight percent aluminum chlorhydrate and temperature upon the gel time of conditioned colloidal silica, various aqueous conditioned colloidal silica systems are prepared using various percentages of colloidal silica and aluminum chlorhydrate, various pH's, hydrochloric acid (HCl) and acetic acid, at various temperatures. The times required for the systems to gel are then observed. The results are recorded in Table I. The notation ~ in the Table means an approximate or extrapolated value.

TABLE I

| Wt. percent Colloidal Silica | pH | Acid Used | Wt. percent Aluminum Chlorhydrate | Temperature | Gel Time Minutes |
|---|---|---|---|---|---|
| 40 | 5.0 | HCl | None | 15° C. | 126 |
| 40 | 5.7 | HCl | None | 15° C. | 67 |
| 40 | 6.5 | HCl | None | 15° C. | 96 |
| 40 | 5.0 | HCl | None | 22° C. | 65 |
| 40 | 5.7 | HCl | None | 22° C. | 27 |
| 40 | 6.5 | HCl | None | 22° C. | 48 |
| 40 | 5.0 | HCl | None | 30° C. | 27 |
| 40 | 5.7 | HCl | None | 30° C. | 15 |
| 40 | 6.5 | HCl | None | 30° C. | 24 |
| 40 | 6.75 | Acetic | None | 22° C. | 110 |
| 40 | 5.9 | Acetic | None | 30° C. | 88 |
| 40 | 6.75 | Acetic | None | 30° C. | 52 |
| 40 | 7.4 | Acetic | None | 30° C. | 120 |
| 40 | 5.9 | Acetic | None | 38° C. | 26 |
| 40 | 6.75 | Acetic | None | 38° C. | 19 |
| 40 | 7.4 | Acetic | None | 38° C. | 64 |
| 20 | 5.6 | HCl | 1.3 | 21° C. | 1 |
| 20 | 5.6 | HCl | 0.8 | 21° C. | 1 |
| 20 | 5.6 | HCl | 0.5 | 21° C. | 1 |
| 20 | 5.6 | HCl | 0.36 | 21° C. | 3 |
| 20 | 5.6 | HCl | 0.31 | 21° C. | 8 |
| 20 | 5.6 | HCl | 0.26 | 21° C. | 18 |
| 20 | ~5.25 | HCl | 0.32 | 21° C. | ~10 |
| 20 | ~5.25 | HCl | 0.28 | 21° C. | ~16 |
| 20 | ~5.25 | HCl | 0.22 | 30° C. | ~14 |
| 20 | ~5.25 | HCl | 0.2 | 30° C. | ~25 |
| 20 | ~5.25 | HCl | 0.18 | 40° C. | ~15 |
| 20 | ~5.25 | HCl | 0.2 | 40° C. | ~10 |
| 20 | 4.9 | HCl | 0.32 | 20° C. | ~34 |
| 20 | 4.9 | HCl | 0.26 | 40° C. | ~10 |
| 20 | 5.1 | HCl | 0.26 | 40° C. | ~5 |
| 20 | 5.35 | HCl | 0.32 | 20° C. | ~6 |
| 20 | 5.35 | HCl | 0.26 | 40° C. | ~2 |
| 15 | 5.25 | HCl | 0.28 | 21° C. | ~35 |
| 15 | 5.25 | HCl | 0.24 | 21° C. | ~>100 |
| 15 | 5.25 | HCl | None | 21° C. | ~>100 |
| 15 | 5.25 | HCl | None | 21° C. | ~>100 |

EXAMPLE II

The following ingredients are combined. All percentages are by weight.

| | |
|---|---|
| 97.96% | Deionized water |
| 1.25% | Alumina-silica fiber having a mean fiber diameter of 2 to 3 microns |
| 0.1% | 40% colloidal silica sol |
| 0.03% | Bentonite Clay |
| .03% | Aluminum chlorhydrate |
| 0.63% | Ground silica having an average particle size of smaller than 325 mesh |

After mixing the ingredients, the slurry is pumped to a forming tank. A 24 by 48 inch mold is then dipped into the forming tank and slurry is pulled into the mold by a vacuum of about 45 cms of mercury and water passes through a 30 mesh screen in the mold thus forming a 24 by 48 inch fiber mat on the screen. After 72 seconds, the mold is removed from the slurry and is allowed to drain for 30 seconds.

The fiber mat is then removed from the mold by means of a vacuum applied by a transfer device on a track. The mat is then transferred to a post soak station where 15 Kg's of a conditioned colloidal silica is uniformly applied to the mat. The conditioned colloidal silica comprises 15 percent by weight colloidal silica, sufficient HCl to adjust the pH to 5.0, and subsequent to adding HCl, sufficient aluminum chlorhydrate to lower the pH to 4.9.

After application of conditioned colloidal silica, a vacuum is applied to uniformly distribute the conditioned colloidal silica throughout the mat. The resulting board is then transferred by means of the transfer device to a drying rack where the board is dried at a temperature of 175° C. for greater than 10 hours. The finished board has a thickness of one inch and a density of 0.48 gms/cc. The board contains no decomposable organic compounds and has a uniform strength and density. The lack of organic compounds prevents flame, fumes and discoloration upon exposure to high temperature conditions.

As used herein, a "vacuum" of an indicated number of millimeters of mercury means a pressure less than prevailing atmospheric pressure by the indicated amount, e.g., a vacuum of 10 mmHg is −10 mmHg gauge pressure.

What is claimed is:

1. A process for forming a refractory fiber article comprising placing a refractory fiber slurry into a mold and draining liquid therefrom; impregnating the resulting fiber article with a conditioned colloidal silica composition comprising colloidal silica, acid and a multivalent cation containing gelling compound; applying a differential pressure through said article, waiting for the conditioned colloidal silica composition to gel and drying the resulting fiber article.

2. The process of claim 1 wherein said fiber slurry is an aqueous slurry containing from about 0.5 to about 3 weight percent of refractory fiber, said article is an insulation board and the multivalent cation containing gelling compound is aluminum chlorhydrate.

3. The process of claim 2 wherein said fiber slurry contains from about 0.04 to about 0.2 weight percent colloidal silica.

4. The process of claim 3 wherein said fiber slurry contains from about 0.01 to about 0.1 weight percent colloidal clay.

5. The process of claim 4 wherein said colloidal clay is bentonite.

6. The process of claim 3 wherein said board is impregnated with from about 10 to about 80 volume percent of said conditioned colloidal silica composition.

7. The process of claim 3 wherein the conditioned colloidal silica is an aqueous composition containing from about 15 to about 20 weight percent $SiO_2$, sufficient hydrochloric acid to obtain a pH of between about 4.8 and about 5.4; from about 0.5 to about 0.12 percent aluminum chlorhydrate by weight of conditioned colloidal silica and the balance being water.

8. The process of claim 1 wherein said fiber board is dried at a temperature of from about 150 to about 600° C. for from about 1 to about 12 hours.

9. An insulation article comprising randomly oriented refractory fibers retained by dried colloidal silica uniformly distributed throughout the article and from about 0.001 to about 1.5 weight percent of aluminum chlorhydrate wherein said article is a board which is formed according to the process of claim 1.

10. The article of claim 9 wherein said multivalent cation containing compound is aluminum chlorhydrate.

* * * * *